United States Patent Office 3,280,204
Patented Oct. 18, 1966

3,280,204
PROCESS OF REACTING AN ALKALI METAL WITH AN ALKYLBENZENE
Herman S. Bloch, Skokie, Ill., assignor to Universal Oil Products Company, Des Plaines, Ill., a corporation of Delaware
No Drawing. Filed June 21, 1965, Ser. No. 465,759
5 Claims. (Cl. 260—665)

This invention is a continuation-in-part of my copending application Serial No. 175,268 filed February 23, 1962, and now abandoned, and relates to a novel process for the preparation of cyclohexadiene tricarboxylic acids.

The products of the process of this invention can be utilized as intermediates in the preparation of new and useful compounds, or as compounds useful in themselves. For example, the cyclohexadiene tricarboxylic acids can be used as intermediates in the preparation of esters which are used in the preparation of artificial perfumes and flavors. In particular, the cyclohexadiene tricarboxylic acids of this invention can be incorporated in polyester resins for plastics, paints, varnishes, and the like. A cyclohexadiene tricarboxylic acid, such as 1-carboxymethyl-2,5-dicarboxy-3,6-cyclohexadiene, can be added to a maleic anhydride-phthalic anhydride glycol ester, used in the manufacture of resinous binders for fiberglass type composites, in which case said cyclohexadiene tricarboxylic acid not only cross-links the polyester via its carboxy substituents but copolymerizes with the maleic acid via its dienic unsaturation to produce hard thermosetting resins.

It is an object of this invention to provide a novel process for the preparation of cyclohexadiene tricarboxylic acids. In one of its broad aspects this invention embodies a process for preparing a cyclohexadiene tricarboxylic acid which comprises the following sequence of steps: (a) reacting an α-alkali-metalloalkylbenzene with an alkali metal at a temperature of from about −30° C. to about 10° C., (b) reacting the resulting metalloalkydimetallocyclohexadiene with carbon dioxide at a temperature of from about −30° C. to about 10° C. and, (c) hydrolyzing the resulting product and recovering the cyclohexadiene tricarboxylic acid thus formed.

Another embodiment relates to a process for preparing a cyclohexadiene tricarboxylic acid which comprises the following sequence of steps: (a) reacting an alkylbenzene with an alkali metal at a temperature of from about 25° C. to about 200° C., said alkylbenzene being characterized in that it contains at least one hydrogen atom attached to an α-carbon atom of the alkyl substituent, (b) reacting the resulting α-metalloalkylbenzene with an alkali metal at a temperature of from about −30° C. to about 10° C., (c) reacting the resulting metalloalkyldimetallocyclohexadiene with carbon dioxide at a temperature of from about −30° C. to about 10° C. and (d) hydrolyzing the resulting product and recovering the cyclohexadiene tricarboxylic acid thus formed.

One specific embodiment of the present invention is in a process of preparing 1-carboxymethyl-2,5-dicarboxy-3,6-cyclohexadiene which comprises the following sequence of steps: (a) reacting toluene with sodium at a temperature of from about 25° C. to about 200° C., (b) reacting the resulting benzyl sodium with sodium at a temperature of from about −30° C. to about 10° C., (c) reacting the resulting 1-sodiomethyl-2,5-disodio-3,6-cyclohexadiene with carbon dioxide at a temperature of from about −30° C. to about 10° C. and (d) hydrolyzing the resulting product and recovering the 1-carboxymethyl-2,5-dicarboxy-3,6-cyclohexadiene.

Other objects and embodiments of the present invention will become apparent in the following detailed specification.

In accordance with the process of this invention, an α-alkali-metalloalkylbenzene is reacted with an alkali metal at a temperature of from about −30° C. to about 10° C. to form a metalloalkyldimetallocyclohexadiene. An α-alkalimetalloalkylbenzene relates to an alkali metal substitution product of an alkylbenzene wherein the alkali metal atom is attached to the carbon atom of the alkyl group to which the benzene nucleus is also attached. The α-alkali-metalloalkylbenzene can be prepared by any conventional or otherwise convenient method. One preferred method comprises reacting an alkylbenzene with an alkali metal at a temperature of from about 25° C. to about 200° C., preferably from about 25° C. to about 125° C., said alkylbenzene containing at least one hydrogen atom attached to an α-carbon atom of the alkyl substituent. An alternative method comprises reacting an alkali metal with an alkylbenzene containing a halogen atom attached to the α-carbon atom of the alkyl substituent in dilute solution of an inert solvent at a temperature of about 30° C. Suitable α-alkali-metalloalkylbenzenes include such as benzyl sodium, α-sodioethylbenzene, α-sodiopropylbenzene, α-sodio-α-methylethylbenzene, α-sodiobutylbenzene, α-sodio-α-methylpropylbenzene, α-sodioamylbenzene, α-sodio-α-methylbutylbenzene, α-sodio-α-ethylpropylbenzene, α-sodiohexylbenzene, α-sodio-α-methylpentylbenzene, α-sodio-α-ethylbutylbenzene, and the like. The alkali metal may be lithium, sodium, potassium, rubidium, or cesium, sodium and potassium being preferred by reason of their availability, particularly sodium because of its relatively low cost.

In further pursuance of the process of this invention the described α-alkali-metalloalkylbenzene is reacted with further amounts of the alkali metal at a reduced temperature forming an α-metalloalkyldialkalimetallocyclohexadiene which is an additive compound of said α-alkali metalloalkylbenzene. At the reaction conditions herein employed, the alkali metal adds substantially exclusively to the double bonds of the benzene nucleus. In consequence of this reaction, the benzene nucleus of the aforesaid α-alkali-metalloalkylbenzene is converted to a cyclohexadiene ring having substituted thereon two alkali metal substituents. The over-all result is an alkali-metalloalkyldialkali-metallocyclohexadiene additive compound of the aforesaid α-alkali-metalloalkylbenzene.

The reaction of the alkali metal and the α-alkali-metalloalkylbenzene is generally reversible at a temperature in excess of about 10° C. so that an operable reaction temperature will not exceed about 10° C. A reaction temperature of from about −30° C. to about 10° C. is satisfactory although a temperature in the lower range, say from about −30° C. to about −10° C., is preferred. Moreover, as the alkali-metalloalkyldialkali-metallocyclohexadiene is generally unstable at a temperature in excess of about 10° C., subsequent reactions therewith are likewise conducted at the aforesaid temperature of from about −30° C. to about 10° C., and preferably at a temperature of from about −30° C. to about −10° C.

In one preferred embodiment of the process of this invention the α-alkali-metalloalkyldialkali-metallocyclohexadiene is 1-sodiomethyl-2,5-disodio-3,6-cyclohexadiene formed by the reaction of benzyl sodium and sodium at a temperature of from about −30° C. to about −10° C. The alkali-metalloalkyldialkali-metallocyclohexadienes prepared in accordance with the process of this invention also include 1-(1-sodioethyl)-2,5-disodio-3,6-cyclohexadiene,
1-(1-sodiopropyl)-2,5-disodio-3,6-cyclohexadiene,
1-(2-sodio-1-methylethyl)-2,5-disodio-3,6-cyclohexadiene,
1-(1-sodiobutyl)-2,5-disodio 3,6-cyclohexadiene,
1-(1-sodio-1-methylpropyl)-2,5-disodio-3,6-cyclohexadiene, 1-(1-sodioamyl)-2,5-disodio-3,6-cyclohexadiene,
1-(1-sodio-1-methylbutyl)-2,5-disodio-3,6-cyclohexadiene,
1-(1-sodio-1-ethylpropyl)-2,5-disodio-3,6-cyclohexadiene,
1-(1-sodiohexyl)-2,5-disodio-3,6-cyclohexadiene,
1-(1-sodio-1-methylpentyl)-2,5-disodio-3,6-cyclohexadiene,
1-(1-sodio-1-ethylbutyl)-2,5-disodio-3,6-cyclohexadiene, and the like.

In a further embodiment of the process of this invention the alkali - metalloalkyldialkyali - metallocyclohexadiene, which is preferably 1-sodiomethyl-2,5-disodio-3,6-cyclohexadiene, is reacted with carbon dioxide at the aforesaid conditions of reduced temperature and the resulting product hydrolyzed to form a corresponding cyclohexadiene tricarboxylic acid—in the preferred instance 1-carboxymethyl-2,5-dicarboxy-3,6 - cyclohexadiene. Other cyclohexadiene tricarboxylic acids including 1-carboxymethyl-2,5-dicarboxy-3,6-cyclohexadiene,
1-(1-carboxyethyl)-2,5-dicarboxy-3,6-cyclohexadiene,
1-(1-carboxypropyl)-2,5-dicarboxy-3,6-cyclohexadiene.
1-(1-carboxy-1-methylethyl)-2,5-dicarboxy-3,6-cyclohexadiene,
1-(1-carboxybutyl)-2,5-dicarboxy-3,6-cyclohexadiene,
1-(1-carboxy-1-methylpropyl)-2,5-dicarboxy-3,6-cyclohexadiene,
1-(1-carboxypentyl)-2,5-dicarboxy-3,6-cyclohexadiene,
1-(1-carboxy-1-methylbutyl)-2,5-dicarboxy-3,6-cyclohexadiene,
1-(1-carboxy-1-ethylpropyl)-2,5-dicarboxy-3,6-cyclohexadiene,
1-(1-carboxylhexyl)-2,5-dicarboxy-3,6-cyclohexadiene,
1-(1-carboxy-1-methylpentyl)-2,5-dicarboxy-3,6-cyclohexadiene,
1-(1-carboxy-1-ethylbutyl)-2,5-dicarboxy-3,6-cyclohexadiene, etc. may be prepared in like manner by treatment of suitable alkali - metalloalkyldialkali-metallocyclohexadienes, such as are herein described, with carbon dioxide.

The process of the present invention may be effected in any suitable manner and may comprise either a batch or a continuous type of operation. For example, when a batch type of operation is employed, a quantity of starting materials comprising an α-hydrogen-containing alkylbenzene and a suitable diluent, if any is used, along with at least a stoichiometric amount of the selected alkali metal, are placed in an appropriate apparatus which may be a rotating autoclave provided with adequate means of temperature control. The reaction conditions at which the present process is effected relate principally to temperature. Pressure does not appear to be an important variable and is merely incidental to the method of operation, being sufficient to provide a substantial liquid phase, and the equipment, such as the aforementioned autoclave, should be able to withstand the autogenous pressure of the reactants at the maximum reaction temperature. After a suitable reaction period, during which the α-hydrogen-containing alkylbenzene is converted to an α-alkali-metalloalkylbenzene, the temperature is lowered to within the prescribed limits to permit further reaction with the alkali metal to form the alkali-metalloalkyldialkali-metallocyclohexadiene. Carbon dioxide may be charged to the process with the initial reactants, but is preferably charged subsequent to the formation of the alkali-metalloalkyldialkali-metallocyclohexadiene. Thus, the carbon dioxide may be reacted with the alkali-metalloalkyldialkali-metallocyclohexadiene substantially concurrently as it is formed, or preferably subsequent thereto. After a suitable reaction period the reaction mixture is warmed to about room temperature and acidified to form the desired tricarboxylic acid from the alkali metal salt thereof. It is generally advantageous to employ a solvent or diluent during the reaction with alkali metal. Diluents which may be employed in the process of this invention comprise inert organic hydrocarbons such as the pentanes, hexanes, heptanes, octanes, nonanes, etc.; cyclic and alkyl substituted cyclic hydrocarbons such as cyclopentane, cyclohexane, cycloheptane, etc., methylcyclopentane, methylcyclohexane, methylcycloheptane, dimethyl ether of ethylene glycol, dioxan, and the like, which do not contain alkali metal-reactive hydrogen atoms.

Another method of effecting the present process is by a continuous type of operation. One convenient method involves the use of three reactors, two of which contain a bed of an alkali metal which is preferably a high surface sodium, i.e., sodium disposed on a high surface area support such as activated alumina. One of the reactors is maintained at the required elevated temperature while the second reactor, together with the third reactor, is maintained at the required reduced temperature. The α-hydrogen-containing alkylbenzene and a suitable diluent are then charged to the first reactor in contact with the high surface sodium maintained therein. The reactor effluent is withdrawn at a rate allowing for a suitable residence time and is charged to the second reactor at a reduced temperature in contact with the high surface sodium maintained therein. After a suitable residence time has elapsed the reaction product is continuously withdrawn from said second reactor and charged to the third reactor in countercurrent flow to a stream of carbon dioxide at the aforesaid conditions of reduced temperature. The desired product is then recovered by acidification of the product stream from the third reactor.

It is apparent that the carboxylic acid substituents of the cyclohexadiene tricarboxylic acids of this invention are limited by the process of this invention as thus far described in that the carboxy groups are attached to the cyclohexadiene ring either directly or through an α-carbon atom. This limitation is obviated by the inclusion of an intermediate step whereby the particular alkali-metalloalkyldialkali-metallocyclohexadiene is reacted with a suitable olefin prior to treatment with carbon dioxide. A suitable olefin includes ethylene, propylene, butene, isobutene, butadiene, pentene, iso-amylene, pentadiene, hexene, and the like. The products isomerize where possible to the α-sodio compound. In one embodiment of this invention the alkali-metalloalkyldialkali-metallocyclohexadiene is reacted with ethylene to form a tri-(alkali-metalloalkyl)-cyclohexadiene for example 1-(1-sodiopropyl)-2,5-di-(1-sodioethyl)-3,6-cyclohexadiene,
1-(1-methyl-1-sodiopropyl)-2,5-di-(1-sodioethyl)-3,6-cyclohexadiene,
1-(1-ethyl-1-sodiopropyl)-2,5-di-(1-sodioethyl)-3,6-cyclohexadiene,
1-(1,1-dimethyl-3-sodiopropyl)-2,5-di-(1-sodioethyl)-3,6-cyclohexadiene,
1-(1-propyl-1-sodiopropyl)-2,5-di(1-sodioethyl)-3,6-cyclohexadiene,
1-(1-methyl-1-ethyl-3-sodiopropyl)-2,5-di-(1-sodioethyl)-3,6-cyclohexadiene,
1-(1-butyl-1-sodiopropyl)-2,5-di-(1-sodioethyl)-3,6-cyclohexadiene,
1-(1-methyl-1-propyl-3-sodiopropyl)-2,5-di-(1-sodioethyl)-3,6-cyclohexadiene,
1-(1,1-diethyl-3-sodiopropyl)-2,5-di-(1-sodioethyl)-3,6-cyclohexadiene,
1-(1-pentyl-1-sodiopropyl)-2,5-di-(1-sodioethyl)-3,6-cyclohexadiene,
1-(1-methyl-1-butyl-3-sodiopropyl)-2,5-di-(1-sodioethyl)-3,6-cyclohexadiene,
1-(1-ethyl-1-propyl-3-sodiopropyl)-2,5-di-(1-sodioethyl)-3,6-cyclohexadiene, etc. It is contemplated that the resulting tri-(alkali-metalloalkyl)-cyclohexadiene may be further reacted with ethylene to prepare higher homologues of the tri-(alkalimetalloalkyl)-cyclohexadienes herein described, of general structure

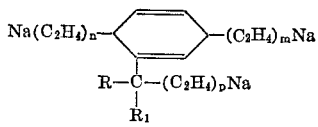

where R and $R_1$ are alkyl groups of 1 to 5 carbon atoms and $n$, $m$ and $p$ are numbers independently chosen from zero and numbers equal to or greater than 1, although $n$, $m$ and $p$ are normally not greater than 3. In the above structure, the $-(C_2H_4)_n-$ and $-(C_2H_4)_m-$ groupings are usually not linear alkylene groups, but have the structure

when $n$ or $m = 2$, and

when $n$ or $m$ is 3.

In one of the preferred embodiments of the process of this invention wherein the alkali-metalloalkyldialkali-cyclohexadiene is 1-sodiomethyl-2,5-disodio-1,3-cyclohexadiene, said compound is reacted with ethylene at the aforesaid conditions of reduced temperature and the product is 1-(1-sodiopropyl)-2,5-di-(1-sodioethyl)-3,6-cyclohexadiene.

The tri-(alkali-metalloalkyl)-cyclohexadiene is thereafter reacted with carbon dioxide to form the corresponding tricarboxylic acid salt which, upon hydrolysis thereof, yields the desired cyclohexadiene tricarboxylic acid. The tri-(alkalimetalloalkyl)-cyclohexadiene is reacted with carbon dioxide at a temperature of from about 20° C. to about 150° C., a temperature of from about 25° C. to about 100° C. being preferred. By way of illustration, the aforementioned 1-(1-sodiopropyl) - 2,5 - di-(1-sodioethyl)-3,6-cyclohexadiene is reacted with carbon dioxide at about room temperature to form 1-(carboxypropyl)-2,5 - di - (1-carboxyethyl)-3,6-cyclohexadiene. Additional cyclohexadiene tricarboxylic acids including 1-(1-carboxypropyl)-2,5 - di-(1-carboxyethyl)-3,6-cyclohexadiene,
1-(1-methyl-1-carboxypropyl) - 2,5 - di-(1-carboxyethyl)-3,6-cyclohexadiene,
1-(1-ethyl-1-carboxypropyl) - 2,5 - di-(1-carboxyethyl)-3,6-cyclohexadiene,
1-(1,1-dimethyl-3-carboxypropyl) - 2,5 - di-(1-carboxyethyl)-3,6-cyclohexadiene,
1-(1-propyl-1-carboxypropyl) - 2,5 - di-(1-carboxyethyl)-3,6-cyclohexadiene,
1-(1-methyl-1-ethyl-3-carboxypropyl) - 2,5 - di - (1-carboxyethyl)-3,6-cyclohexadiene,
1-(1-butyl-1-carboxypropyl) - 2,5 - di-(1-carboxyethyl)-3,6-cyclohexadiene,
1-(1-methyl-1-propyl-3-carboxypropyl) - 2,5 - di - (1-carboxyethyl)-3,6-cyclohexadiene,
1-(1,1-diethyl-3-carboxypropyl) - 2,5 - di - (1 - carboxyethyl)-3,6-cyclohexadiene,
1-(1-pentyl-1-carboxypropyl) - 2,5 - di-(1-carboxyethyl)-3,6-cyclohexadiene,
1-(1-methyl-1-butyl-3-carboxypropyl) - 2,5 - di - (1-carboxyethyl)-3,6-cyclohexadiene,
1-(1-ethyl-1-propyl-3-carboxypropyl) - 2,5 - di - (1-carboxyethyl)-3,6-cyclohexadiene, etc., may be prepared in this manner.

Although under the operating conditions described the products of the reactions discussed above are believed to be 1-alkali-metalloalkyl - 2,5 - dialkali-metallo-3,6-cyclohexadienes and the corresponding carboxy acids or carboxyethyl derivatives, some isomerization will normally occur during and after preparation of the trialkali-metallo derivatives, so that isomeric products may be formed. Thus the double bonds in the cyclohexadiene ring may be shifted to form conjugated dienes (e.g. 1,3-hexadienes or 2,4-hexadienes). Further, because of shifts occurring during ring metallation as well as the possibility of ring metallation at several alternative positions, isomeric ring metallo-derivatives may likewise be formed. Generically, the products may all be designated as 1-alkali-metalloalkyl-n,n' - dialkali-metallo-m,m'-cyclohexadienes, where n, n', m, and m' represent ring positions from 1 to 6 but n and n' are different from m and m', and the corresponding carboxy and carboxyethyl derivatives thereof.

The following examples are given to illustrate the process of the present invention, which, however, are not intended to unduly limit the generally broad scope of this invention in strict accordance therewith.

*Example I*

A solution of one mol of toluene in about three mols of cyclohexane and three mols of finely divided sodium metal are placed in a glass liner and inserted in an 850 cc. capacity rotating autoclave. The autoclave is sealed and rotated at a temperature of from about 25° C. to about 200° C. for a period of about two hours. The temperature of the autoclave contents is thereafter reduced to from about −30° C. to about −10° C. and the autoclave is further rotated at this temperature for an additional two hours. The product of this reaction comprises 1-sodiomethyl-2,5-disodio-3,6-cyclohexadiene.

*Example II*

About 150 g. of carbon dioxide is charged to the autoclave containing the reaction mixture of Example I comprising 1-sodiomethyl - 2,5 - disodio-3,6-cyclohexadiene. The autoclave contents are maintained at the aforesaid temperature of from about −30° C. to about −10° C. and the autoclave rotated at said temperature until the carbon dioxide is no longer absorbed as indicated by the pressure reading. The autoclave is thereafter brought to about room temperature and depressured. The reaction mixture is first treated with small amounts of isopropyl alcohol to remove any unreacted sodium metal and thereafter treated with dilute hydrochloric acid. The resulting aqueous and hydrocarbon layers are filtered and the residue recovered. The residue comprises 1-carboxymethyl-2,5-dicarboxy-3,6-cyclohexadiene which may be further purified by fractional crystallization.

*Example III*

About 80 atmospheres of ethylene is charged to an autoclave containing therein 1-sodiomethyl-2,5-disodio-3,6-cyclohexadiene prepared in the manner described in Example I. The autoclave is maintained at a temperature of from about −30° C. to about −10° C. and rotated at this temperature for a period of about 2 hours, the ethylene being recharged as the pressure dropped until a total of 90 g. has been added. The temperature of the autoclave is thereafter brought to about room temperature and the autoclave is depressured. The reaction mixture comprises 1-(1-sodiopropyl) - 2,5 - di-(1-sodioethyl)-3,6-cyclohexadiene which may be recovered from the reaction mixture or said reaction mixture may be further treated as in Example IV.

*Example IV*

About 150 g. of carbon dioxide is charged to the autoclave containing the reaction mixture of Example III which comprises 1-(1-sodiopropyl) - 2,5 - di - (1-sodioethyl)-3,6-cyclohexadiene. The autoclave contents are maintained at about room temperature and the autoclave rotated at said temperature until the carbon dioxide is no longer absorbed as indicated by the pressure reading. The autoclave is thereafter depressured and the product comprising 1-(1-carboxypropyl) - 2,5 - di - (1-carboxyethyl)-3,6-cyclohexadiene is recovered in the manner described in Example I.

I claim as my invention:

1. A process which comprises:

reacting a mono-alkylbenzene with an alkali metal in the absence of a promoter at a temperature of from about 25° C. to about 200° C., said alkylbenzene being characterized in that the alkyl substituent thereof contains from 1 to 6 carbon atoms and has at least one hydrogen atom attached to an α-carbon atom of the alkyl substituent, and forming an alpha-metalloalkylbenzene.

2. A process which comprises:

reacting toluene with sodium in the absence of a promoter at a temperature of from about 25° C. to about 200° C. to form benzyl sodium.

3. The process which comprises reacting a mono-alkylbenzene with an alkali metal in the absence of a promoter at a temperature of from about 25° C. to about 200° C., said mono-alkylbenzene being characterized in that the alkyl substituent contains from 1 to 6 carbon atoms and has at least one hydrogen atom attached to an alpha-carbon atom thereof, thereby forming an alpha-metalloalkylbenzene; and then reacting said alpha-metalloalkylbenzene with an alkali metal at a temperature of from about −30° C. to about −10° C. and forming a metalloalkyldimetallocyclohexadiene.

4. The process which comprises reacting a mono-alkylbenzene with sodium in the absence of a promoter at a temperature of from about 25° C. to about 200° C., said monoalkylbenzene being characterized in that the alkyl substituent contains from 1 to 6 carbon atoms and has at least one hydrogen atom attached to an alpha-carbon atom thereof, thereby forming an alpha-sodioalkylbenzene; and then reacting said alphasodioalkylbenzene with sodium at a temperature of from about −30° C. to about 10° C. and forming a sodioalkyldisodiocyclohexadiene.

5. The process which comprises reacting toluene with sodium in the absence of a promoter at a temperature of from about 25° C. to about 200° C. to yield benzyl sodium; and then reacting said benzyl sodium with sodium at a temperature of from about −30° C. to about 10° C. and forming 1-sodiomethyl-2, 5-sodio-3,6-cyclohexadiene.

References Cited by the Examiner

UNITED STATES PATENTS

| 2,548,803 | 4/1951 | Little | 260—671 X |
| 2,849,508 | 8/1958 | Pines | 260—671 X |
| 2,960,544 | 11/1960 | Mador et al. | 260—514 |

OTHER REFERENCES

Gilman et al.: J. Am. Chem. Soc., vol. 62 (1940), pp. 1514–1519.

Pines et al.: J. Am. Chem. Soc., vol. 77 (1955) pp. 554–559.

LORRAINE A. WEINBERGER, *Primary Examiner.*

R. K. JACKSON, *Assistant Examiner.*